United States Patent
Ostwald

(10) Patent No.: US 10,029,365 B2
(45) Date of Patent: Jul. 24, 2018

(54) MOVABLE CLOSED-CHAIN LINKAGE FOR ROBOT ARM OF MEDIA ELEMENT STORAGE LIBRARY

(71) Applicant: ORACLE INTERNATIONAL CORPORATION, Redwood City, CA (US)

(72) Inventor: Timothy Craig Ostwald, Boulder, CO (US)

(73) Assignee: Oracle International Corporation, Redwood City, CA (US)

( * ) Notice: Subject to any disclaimer, the term of this patent is extended or adjusted under 35 U.S.C. 154(b) by 248 days.

(21) Appl. No.: 14/578,675

(22) Filed: Dec. 22, 2014

(65) Prior Publication Data
US 2016/0180876 A1  Jun. 23, 2016

(51) Int. Cl.
| | |
|---|---|
| *B25J 9/10* | (2006.01) |
| *G11B 15/68* | (2006.01) |
| *B25J 9/02* | (2006.01) |
| *G11B 17/22* | (2006.01) |

(52) U.S. Cl.
CPC ............ *B25J 9/106* (2013.01); *B25J 9/023* (2013.01); *G11B 15/6835* (2013.01); *G11B 17/225* (2013.01); *Y10S 901/02* (2013.01); *Y10S 901/25* (2013.01); *Y10S 901/29* (2013.01); *Y10S 901/50* (2013.01)

(58) Field of Classification Search
CPC .............................. G11B 17/056; G11B 33/02
USPC ........................................ 720/600; 360/92.1
See application file for complete search history.

(56) References Cited

U.S. PATENT DOCUMENTS

| | | | |
|---|---|---|---|
| 6,064,544 A * | 5/2000 | Wada .................... | G11B 17/225 360/92.1 |
| 6,393,335 B1 | 5/2002 | Ostwald | |
| 6,532,402 B2 | 3/2003 | Ostwald et al. | |
| 6,922,307 B2 | 7/2005 | Ostwald et al. | |
| 8,176,505 B2 | 5/2012 | Grow | |
| 9,001,457 B1 * | 4/2015 | Ostwald ............. | G11B 15/6835 360/92.1 |
| 2004/0202062 A1 * | 10/2004 | Ostwald ............... | G11B 17/225 360/92.1 |

* cited by examiner

*Primary Examiner* — Carlos E Garcia
(74) *Attorney, Agent, or Firm* — Marsh Fischmann & Breyfogle LLP; Jonathon A. Szumny

(57) ABSTRACT

Utilities (e.g., systems, apparatuses, methods) that reduce robotic assembly contention in media element storage libraries by rotating (e.g., flipping, swinging, etc.) a robot arm of a first robotic assembly mounted over a first of first and second spaced storage arrays in a storage library into a first position between the first storage array and a central reference plane disposed between and parallel to the first and second storage arrays to allow a robot arm of a second robotic assembly to slide or otherwise move past the robot arm of the first robotic assembly (e.g., in a direction along or parallel to an x-axis parallel to the first and second storage arrays), even when the robot arms of the first and second robotic assemblies are disposed at the same height (e.g., along a z-axis that is perpendicular to the x-axis) within the storage library.

20 Claims, 8 Drawing Sheets

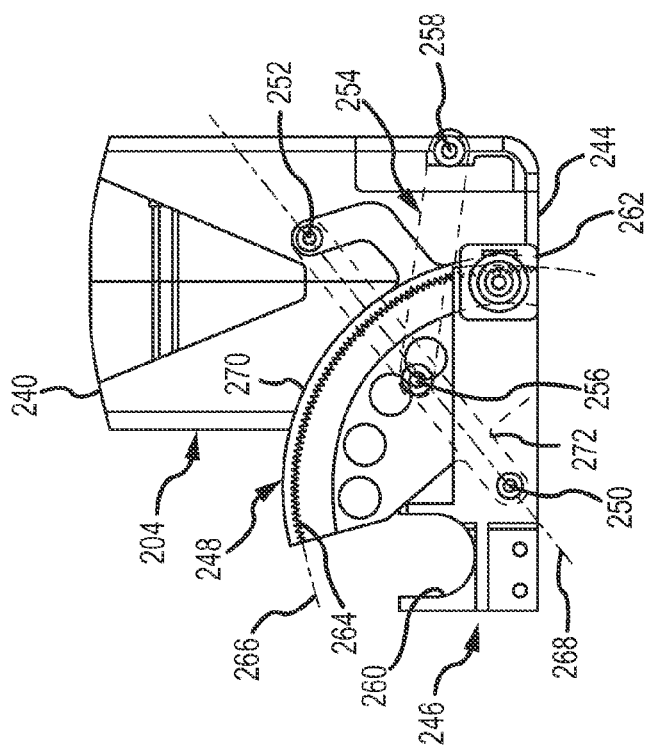
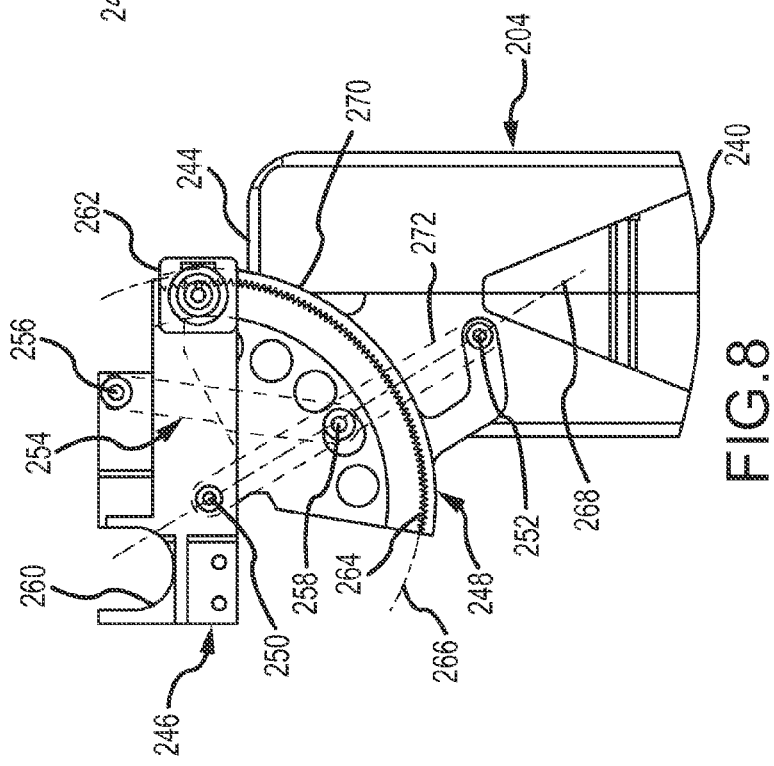

MOVABLE CLOSED-CHAIN LINKAGE FOR ROBOT ARM OF MEDIA ELEMENT STORAGE LIBRARY

BACKGROUND

1. Field of the Invention

The present invention relates generally to storage libraries for storing a plurality of media elements such as tape cartridges and, more particularly, to robotic assemblies that are configured to manipulate media elements within a storage library.

2. Relevant Background

Storage library systems are often used by enterprises and the like to efficiently store and retrieve data from storage media. In the case of some storage libraries, the media may be data or media elements (e.g., tape cartridges) that are typically stored and indexed within a set of magazines. When particular data is requested, for instance, a specialized robotic assembly or mechanism (e.g., robotic module) finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

To operate properly, each robotic mechanism is expected to reliably (e.g., repeatedly and accurately) and rapidly find, retrieve, and deliver desired media elements (e.g., per instructions from one or more host computers) throughout the storage library cartridge inventory. Generally, a robotic mechanism includes a hand assembly (e.g., including a picker assembly) that is operable to reliably grip a desired cartridge and remove it from a magazine or drive, or to reliably grip a cartridge and release the cartridge into a desired magazine slot or drive. The robotic mechanism is often configured to translate or displace an arm on or in which the hand assembly is mounted along the z axis (e.g., in the vertical dimension along a column of media elements) and along an x or y axis (e.g., in a horizontal dimension along a row of media elements), such as through any appropriate arrangement of gears, tracks, belts, cables, hydraulics, and/or other such control mechanisms. Some robotic mechanisms are configured to pivot or rotate the arm and/or hand assembly about one or more of the x, y, or z axes (e.g., roll, pitch and yaw, respectively).

As automated storage libraries have become larger and more complex, their designs have evolved from a single wall or array of storage slots to multiple walls of storage slots in various shapes and configurations. For instance, one type of storage library includes first and second spaced storage arrays separated by an aisle and whose storage or magazine slots generally face each other. A robotic assembly (e.g., robotics module) mounted over one of the storage arrays is configured to manipulate media elements on the storage array, such as by grabbing and removing a media element and mounting the media element in another storage slot or media drive or by grabbing and inserting a media element into a particular storage slot of the array. In one arrangement, a robotic assembly may be configured to manipulate media elements of either of the first or second spaced storage arrays, such as by pivoting or rotating its robot arm through 180° or the like to access the first or second storage arrays as appropriate. In an attempt to increase throughput, two or more robotic assemblies may be mounted on the same rail assembly over one of the storage arrays, where the robot arms of each of the robotic assemblies can access media elements of both of the first and second storage arrays, such as by pivoting or rotating its robot arm through 180° or the like to access the first or second storage arrays as appropriate.

SUMMARY

One problem that arises when two or more robotic assemblies are mounted on the same rail assembly over the same storage array is contention between the first and second robotic assemblies when trying to simultaneously complete different respective jobs. In the case where a first robotic assembly moves to the middle of the first or second storage arrays (e.g., to retrieve a media element, to access a media player, etc.), for instance, a second robotic assembly would have to wait to access the middle of the first or second storage array or any location on the other end of the first or second storage array due to the inability of first and second robotic assemblies on the same rail assembly to be able to pass each other. Even if such first and second robotic assemblies were respectively mounted over the first and second storage arrays on different respective rail assemblies, contention would still result because the pivot axes of the robot arms are typically disposed halfway between the first and second storage arrays to allow the robot arms to access either of the first or second storage arrays by pivoting or swinging through 180°.

More specifically, attempting to move the first robotic assembly past the second robotic assembly (or vice versa) would result in contact or interference between the first and second robotic assemblies as both of their robot arm pivot axes are disposed halfway between the first and second storage arrays (e.g., when the robot arms of the first and second robotic assemblies are disposed at the same height or position along the z-axis). In this situation, a system controller or the like would receive signals regarding the potential contact or contention and accordingly inhibit movement of first robotic assembly to complete its job until the second robotic assembly has been moved out of the path of the first robotic assembly resulting in media element access delays and other inefficiencies.

In view of the foregoing, disclosed herein is a system that rotates or flips a robot arm of a robotic assembly within a media element storage library between a first position adjacent a first storage array of the storage library on one side of a central reference plane disposed between and parallel to the first storage array and a spaced second storage array, and a second position adjacent the second storage array of the storage library on an opposite second side of the central reference plane. More specifically, a first free end of the robot arm (e.g., through which a picker assembly or the like is configured to extend for manipulating media elements) is disposed adjacent and facing the first storage array in the first position of the robot arm while a second free end of the robot arm opposite the first free end is disposed on one side of the central reference plane and between the first storage array and the central reference plane.

A space is thus created within the aisle of the storage library between the central reference plane and the second storage array when the robot arm is in its first position (i.e., with its first free end adjacent the first storage array) through which another robotic assembly mounted over the second storage array (e.g., and in its respective first position adjacent the second storage library) can translate or move free of contact with the first robotic assembly to eliminate or reduce robotic assembly contention and other related inefficiencies in media element storage libraries. In the second position of the robot arm, the first free end of the robot arm is disposed adjacent and facing the second storage array while the second free end of the robot arm is disposed on an opposite side of the central reference plane between the second storage array and the central reference plane which essentially allows the robot arm to "reach across" the aisle between the first and second storage arrays to access media elements of the second storage array.

As used herein, the x-axis is defined to be an axis that is horizontal and parallel to the front faces of the first and second storage arrays (e.g., parallel to the openings of the storage slots of the first and second storage arrays), the y-axis is defined to be an axis that is horizontal and perpendicular to the front faces of the first and second storage arrays (e.g., perpendicular to the openings of the storage slots of the first and second storage arrays), and the z-axis is defined to be an axis that is vertical and parallel to the front faces of the first and second storage arrays (e.g., parallel to the openings of the storage slots of the first and second storage arrays).

Broadly, a robot arm (e.g., hand assembly) of the disclosed robotic assembly may be attached to a mounting apparatus through a series of linkages (e.g., bodies, bars, etc.) between the mounting apparatus and the robot arm that effectively collectively form a movable closed-chain linkage to move the robot arm between its first and second positions. In one arrangement, the robot arm may be pivotally attached to the mounting apparatus through first and second rigid linkages to form a four-bar linkage where the mounting apparatus serves as the fixed link or frame, the first linkage serves as the driver or crank, the second linkage serves as the rocker or follower, and the robot arm serves as the coupler or connector between the first and second linkages. More specifically, the first linkage is pivotally attached to the mounting apparatus and the robot arm at first and second respective pivot axes while the second linkage is pivotally attached to the mounting apparatus and the robot arm at first and second respective pivot axis that are different than those of the first linkage. The locations of the pivot axes may be specifically chosen to induce the movement of the robot arm between its first and second (e.g., and intermediate) positions in response to an input force applied to the first linkage to rotate the first linkage about its first pivot axis through the mounting apparatus in one of clockwise or counterclockwise directions.

In this regard, an input force applied to the first linkage to rotate the first linkage about its first pivot axis through the mounting apparatus (e.g., in one of a clockwise or counterclockwise direction) induces the second linkage to also rotate about its first pivot axis through the mounting apparatus (e.g., in the one of the clockwise or counterclockwise direction) which moves the robot arm between its first and second positions. In the first position of the robot arm, a first free end of the robot arm (e.g., from which a picker assembly is configured to emerge for manipulating media elements) is positioned adjacent and facing a first storage array over which the robot arm is mounted while an opposite second free end of the robot arm is positioned adjacent and facing a first side of a central reference plane disposed halfway between and parallel to the first and second storage arrays (e.g., parallel to front faces of the first and second storage arrays) and between the first storage array and the central reference plane.

Thereafter, rotation of the first linkage about its first pivot axis through the mounting apparatus induces movement of the robot arm into its second position. More specifically, rotation of the first linkage about its first pivot axis through the mounting apparatus in one of a clockwise or counterclockwise direction induces movement of a reference point on the first free end of the robot arm along a first curvilinear path into a second position adjacent and facing a second storage array that is spaced from and faces the first storage array. Simultaneous with movement of the first free end, rotation of the first linkage about its first pivot axis through the mounting apparatus also induces movement of a reference point on the second free end of the robot arm along a second curvilinear path into a second position adjacent and facing an opposite second side of the central reference plane and between the second storage array and the central reference plane. Rotation of the first linkage about its pivot axis through the mounting apparatus in the other of the clockwise or counterclockwise direction induces simultaneous movement of the first and second free end reference points back along their respective first and second curvilinear paths into their respective first positions.

In this regard, the disclosed movable closed-chain linkage constrains movement of the first free end of the robot arm between a first position adjacent and facing the first storage array and a second position adjacent and facing the second storage array while simultaneously constraining movement of the second free end of the robot arm between a first position adjacent one side of the central reference plane and facing the second storage array and a second position adjacent an opposite side of the central reference plane and facing the first storage array. The overall effect of this movement of the first and second free ends is an effective rotation or flipping of the robot arm through 180° or the like from a first position between the first storage array and the central reference plane and an at least partially spaced second position between the second storage array and the central reference plane.

A space is thus created between the central reference plane and the second storage array when the robot arm is in its first position (with its first free end adjacent the first storage array) through which another robotic assembly mounted over the second storage array can translate or move free of contact with the first robotic assembly. The mounting apparatus may be rigidly connected to a z-axis guiding apparatus of the robotic assembly that moves the mounting apparatus and thus the robot arm along or parallel to a z-axis within the storage library while the z-axis guiding apparatus may be attached to an x-axis guiding apparatus that moves the z-axis guiding apparatus and thus the mounting apparatus and robot arm along or parallel to an x-axis within the storage library.

The first rigid linkage may be driven about its first pivot axis through the mounting apparatus to induce the movement of the robot arm disclosed herein in any appropriate manner. As one simplistic example, a drive shaft of a motor may be directly connected to a pivot member of the first linkage along its first pivot axis through the mounting apparatus such that rotation of the drive shaft about the first pivot axis induces corresponding rotation of the pivot member and thus the first linkage about the first pivot axis. As another example, the first linkage may include a series of gear teeth disposed along a curvilinear path (e.g., arc) that are configured to be engaged by a corresponding series of gear teeth of a drive shaft of a motor that is rigidly mounted to the mounting apparatus (or that is otherwise non-movable relative to the mounting apparatus). For instance, the series of gear teeth of the first linkage may form at least a portion of an annular gear disposed on or built into the first linkage while the series of gear teeth of the drive shaft may be disposed on a pinion attached to the motor shaft that is configured to engage with the annular gear. Upon rotation of the drive shaft (e.g., in response to a corresponding signal from a system controller or the like), the drive shaft gear teeth engage with those of the first rigid linkage to rotate the first rigid linkage about its first pivot axis through the mounting apparatus thereby inducing rotation of the second rigid linkage about is first pivot axis through the mounting apparatus and the above-discussed movement of the robot arm between its first and second positions When the robot arm of a first robotic assembly that is mounted over the first storage array is in its first position, its first free end is adjacent and facing the first storage array (e.g., to allow a picker to emerge from the first free end to manipulate media elements of the first storage array) and its opposite second free end is spaced from the first storage array but positioned between the first storage array and the central reference plane. Similarly, when the robot arm of a second robotic assembly mounted over the second storage array is in its first position, its first free end is adjacent and facing the second storage array (e.g., to allow a picker to emerge from the first free end to manipulate media elements of the second storage array) and its second free end is positioned between the second storage array and the central reference plane.

In this regard, the robot arm of the first robotic assembly is fully contained or disposed between the first storage array and the central reference plane (but does not overlap or intersect the central reference plane) when in its first position and the robot arm of the second robotic assembly is fully contained or disposed between the second storage array and the central reference place (but does not overlap or intersect the central reference plane) when in its first position. Advantageously, the robot arm of either of the first and second robotic assemblies can move past (e.g., along the x-axis) the robot arm of the other of the first and second robotic assemblies when in their first positions, even when the robot arms are positioned at the same height along the z-axis.

Thereafter, when the robot arms are no longer overlapping along the x-axis (when one of the robot arms has moved past the other of the robot arms), the robot arm of at least one of the first and second robotic assemblies can be moved (e.g., via a corresponding motor and system controller) into its second position which, as discussed above, flips the robot about 180° or the like to position the first free end of the robot arm (through which the picker assembly emerges) adjacent and facing the other of the first and second storage arrays for manipulation of media elements thereof. For instance, pivoting of the first linkage of the first robotic assembly about its first pivot axis through its mounting apparatus positions the first free end of its robot arm adjacent and facing the second storage array while simultaneously positioning the opposite second free end of the robot arm on an opposite side of the central reference plan to allow the robot arm to "reach across" the aisle or interior space between the first and second storage arrays to access media elements of the second storage array. In the second position, the robot arm of the first robotic assembly is disposed between the second storage array and the central reference plane.

In one arrangement, each robotic assembly may have at least one x-axis guide or guiding member or apparatus, such as upper and lower x-axis guide members or apparatuses that are slidable or translatable along an x-axis within respective upper and lower tracks or grooves that are adjacent upper and lower portions of the first and second storage arrays. In another arrangement, the upper and lower guide members of each robotic assembly may be slidable within respective upper and lower tracks or grooves along an x-axis adjacent the ceiling and floor of the storage library. In further arrangements, the robotic assemblies may be translatable along the x-axis in other manners such as through magnetic strips, optical guides, and/or the like. In any case, each robotic assembly may include any appropriate z-axis guide member or apparatus (e.g., rail assembly) interconnected between the upper and lower x-axis guide members along which the robot arm is configured to translate or slide along the z-axis. For instance, the mounting apparatus of each robotic assembly may be rigidly secured to a sliding member that is configured to slide or translate along a z-axis relative to the x-axis guide members of the robotic assembly.

In one aspect, a robotic assembly for manipulating media elements in a media element storage library is disclosed that includes a mounting apparatus; a robot arm configured to manipulate media elements of either of a first storage array of the storage library and a second storage array of the storage library that is spaced from the first storage array, where the robot arm includes a first free end and an opposite second free end; a first rigid linkage pivotally attached to the mounting apparatus at a first pivot axis through the mounting apparatus and pivotally attached to the robot arm at a second pivot axis through the robot arm; and a second rigid linkage pivotally attached to the mounting apparatus at a first pivot axis through the mounting apparatus and pivotally attached to the robot arm at a second pivot axis through the robot arm. The first pivot axis of the first rigid linkage is spaced from the first pivot axis of the second rigid linkage and the second pivot axis of the first rigid linkage is spaced from the second pivot axis of the second rigid linkage. Rotation of the first rigid linkage about its first pivot axis through the mounting apparatus induces movement of the first free end of the robot arm between a first position adjacent and facing the first storage array and a second position adjacent and facing the second storage array while simultaneously inducing movement of the opposite second free end of the robot arm between a first position on a first side of a central reference plane between the first and second storage arrays and a second position on an opposite second side of the central reference plane.

In one arrangement, the first rigid linkage includes a series of gear teeth that are configured to be engaged by a corresponding series of gear teeth to drive rotation of the first rigid linkage about its first pivot axis through the mounting apparatus. For instance, the series of gear teeth of the first rigid linkage may follow a curvilinear path (e.g., as part of an annular gear or the like). As another example, the first rigid linkage may include spaced first and second portions, where the first portion is pivotally attached to the second pivot axis through the robot arm over a first surface of the robot arm, where the second portion is pivotally attached to the second pivot axis through the robot arm over a second surface of the robot arm, wherein the first surface is opposite the second surface, and where one of the first and second portions includes the series of gear teeth.

In another aspect, a method of operating a robotic assembly of a media element storage library is disclosed that includes first moving a first free end of a robot arm of a robotic assembly from a first position adjacent a first storage array of a media element storage library to a second position adjacent a second storage array that is spaced from the first storage array; and second moving, simultaneous with the first moving, a second free end of the robot arm from a first position to a second position towards the second storage array and spaced from the first position of the second free end, wherein the first free end is opposite the second free end.

In one arrangement, the first moving may include moving a reference point on the first free end along a first course on a first curvilinear path between the first and second positions of the first free end and the second moving may include moving a reference point on the second free end along a first course on a second curvilinear path between the first and second positions of the second free end. For instance, the method may further include third moving the first free end of the robot arm of the robotic assembly from the second position adjacent the second storage array to the first position adjacent the first storage array, where the third moving includes moving the reference point on the first free end along a second course on the first curvilinear path that is opposite to the first course; and fourth moving, simultaneous with the third moving, the second free end of the robot arm from the second position to the first position towards the first storage array, where the fourth moving includes moving the reference point on the second free end along a second course on the second curvilinear path that is opposite to the first course.

In another arrangement, the method includes first rotating a first rigid linkage about a first pivot axis through a mounting apparatus, where the first rigid linkage is pivotally attached to the robot arm at a second pivot axis; and second rotating, in response to and simultaneous with the first rotating, a second rigid linkage about a second pivot axis through the mounting apparatus, where the second rigid linkage is pivotally attached to the robot arm at a second pivot axis, and where the first and second rotating induce the first and second moving.

In a further aspect, a media element storage library includes a first storage array including a plurality of media element storage slots, a second storage array including a plurality of media element storage slots that are spaced from and face the media element storage slots of the first storage array, a first robotic assembly configured to translate over the first storage array parallel to an x-axis, and a second robotic assembly configured to translate over the second storage array parallel to the x-axis. The first robotic assembly includes a robot arm that is positionable in a first position for manipulating media elements in the media element storage slots of the first storage array and in a second position for manipulating media elements in the media element storage slots of the second storage array, and the second robotic assembly includes a robot arm that is positionable in a first position for manipulating media elements in the media element storage slots of the second storage array and in a second position for manipulating media elements in the media element storage slots of the first storage array. The robot arms of the first and second robotic assemblies are simultaneously positionable in their respective first positions at a common height along a z-axis and a common position along the x-axis, where the z-axis is perpendicular to the x-axis.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 7 is a plan view of the robotic assembly of FIG. 3 in the first position with x and z-axis guiding apparatuses removed for clarity.

FIG. 8 is a plan view of the robotic assembly of FIG. 5 in the second position with x and z-axis guiding apparatuses removed for clarity.

DETAILED DESCRIPTION

Disclosed herein are systems and apparatuses that reduce robotic assembly contention for job completions in media element storage libraries by rotating (e.g., flipping, swinging, etc.) a robot arm of a first robotic assembly mounted over a first of first and second spaced storage arrays in a storage library into a first position between the first storage array and a central reference plane disposed between and parallel to the first and second storage arrays to create a space that allows a robot arm of a second robotic assembly to slide or otherwise move past the robot arm of the first robotic assembly (e.g., in a direction along or parallel to an x-axis parallel to the first and second storage arrays), even when the robot arms of the first and second robotic assemblies are disposed at the same height (e.g., along a z-axis that is perpendicular to the x-axis) within the storage library. Once the second robotic assembly has moved past the first robotic assembly, the disclosed system and apparatus may rotate (e.g., flip, swing) the robot arm of the first robotic assembly into a second position between the second storage array and a central reference plane to allow the robot arm of the first robotic assembly to manipulate media elements of the second storage array. For instance, each robotic assembly disclosed herein may incorporate a movable closed-chain linkage that constrains movement of its robot arm between the first and second positions.

Figure 1:
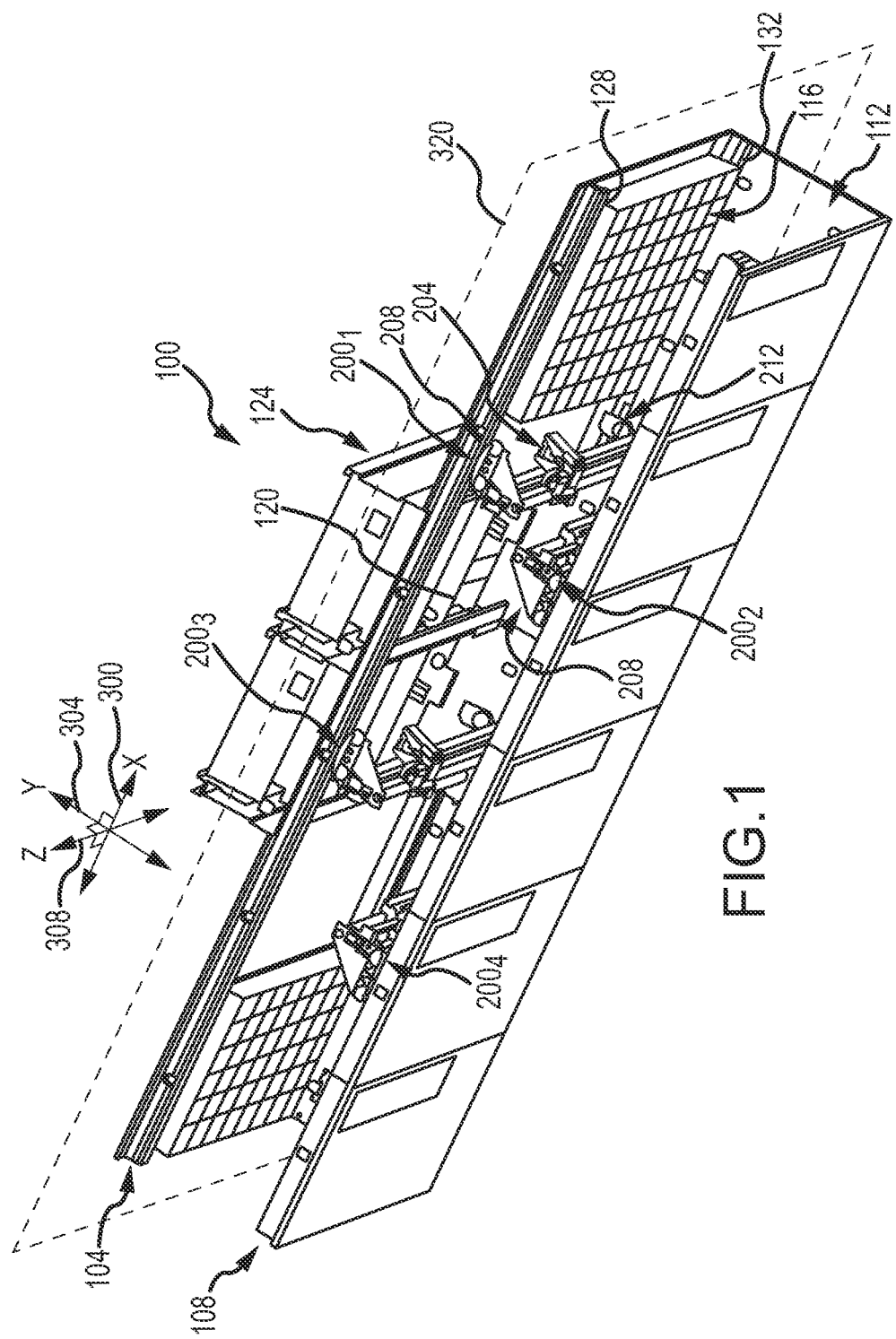
FIG. 1 is a perspective view of a media element storage library within which the robotic assemblies disclosed herein may be utilized.
Figure 2:
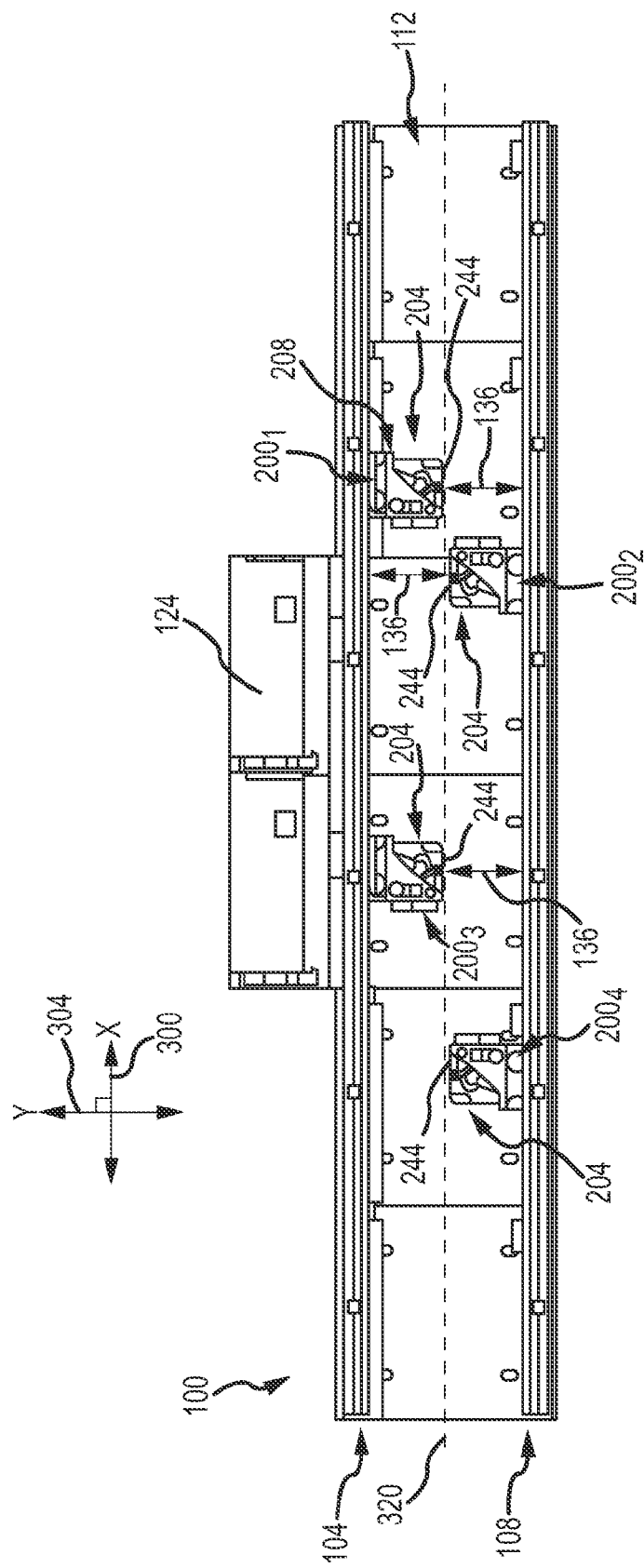
FIG. 2 is a plan view of the media element storage library of FIG. 1.

Before discussing the disclosed systems and apparatuses in more detail, reference is now initially made to FIGS. 1-2 which present views of a media element storage library 100 within which the disclosed robotic assemblies 200 may be incorporated in a manner that reduces contention between the robotic assemblies 200 to complete jobs within the storage library 100. Broadly, the storage library 100 may be a data storage and retrieval system for one or more computers, servers, and/or the like and may be designed for handling and storing a plurality of media elements and for reading and writing to the media elements using media element players. As used herein, a media element denotes any physical substrate suitable for storing data, such as a tape cartridge and/or the like. A media element player may be a media element reader and/or writer (such as a tape drive) that translates the data stored on a media element into signals readable by a computer and/or server for reading operations and/or writes data to the media element in response to a command from the computer and/or server for writing operations. While FIGS. 1-2 illustrate one embodiment of a storage library, it is to be understood that the robotic assemblies 200 disclosed herein may be utilized in numerous other storage libraries and contexts in which it is desired to limit robotic assembly contention for media element job completion.

Generally, the storage library 100 may be constructed of any appropriate upright framework or structure that allows for rapid storage and access of media elements by the robotic assemblies 200 (e.g., first, second, third and fourth robotic assemblies $200_1$, $200_2$, $200_3$, $200_4$) based on commands received from any appropriate interconnected system controller and/or host device (e.g., server, computer, etc.). As an example, the storage library 100 may include a first storage wall or array 104 and an opposite second storage wall or array 108 spaced from the first storage array 104 by an aisle or interior portion 112. Each of the first and second storage arrays 104, 108 may include a plurality of media element storage slots 116 for receiving respective media elements (not shown), where the storage cells or slots 116 of the first storage array 104 oppose or face the storage slots 116 of the second storage array 108. In one arrangement, the various storage slots 116 may be embodied within a plurality of removable storage library modules (e.g., magazines, not shown) of any appropriate form factors that are configured to be positioned within (e.g., inserted into) respective bays (not shown) formed on or in inside surfaces of the first and second storage arrays 104, 108 and removably secured to the first and second storage arrays such as via latches, thumbscrews, and/or the like (e.g., where the various bays may be spaced by any appropriate spacing such as by 1U, 2U, or the like).

Each robotic assembly 200 may be generally configured to move in a various manners and dimensions within the interior portion 112 of the storage library 100 to manipulate one or more media elements within the storage library 100. As an example, each robotic assembly 200 may include a robot arm 204 (e.g., hand assembly) housing a media element "picker assembly" (not shown) that is configured (e.g., based on command signals received from the system controller and/or host computer) to grab and release media elements as part of manipulating media elements in storage slots 116 of either of the first or second storage arrays 104, 108 within the storage library 100. For instance, each robotic assembly 200 may be configured to remove media elements from storage slots 116 of either of the first or second storage arrays 104, 108 and insert the same into media element players 120 (e.g., tape drives) for reading and/or writing of data, remove media elements from the media element players 120 and insert the same into the slots 116 of either of the first and second storage arrays 104, 108, read labels on the media elements or media players 120, deliver or retrieve media elements from a media element import/export opening of the storage library 100, and/or the like. The various media element players 120 may be housed within media player cabinets 124 positioned adjacent the first or second storage arrays 104, 108 for access by the robotic assemblies 200 and/or elsewhere within the storage library 100.

The storage library 100 may include a removable power/controller module (not shown) that includes, inter alia, a power supply for supplying the power required by the robotic assemblies 200 to manipulate the media elements and control electronics for generating electrical control signals to control the operation of the robotic assemblies 200. For instance, the power/controller module may be plugged into and removed from a respective bay or slot of the storage library 100. Furthermore, the power/controller module may include or be associated with any appropriate computer program products, i.e., one or more modules of computer program instructions encoded on a non-transitory computer-readable medium for execution by a data processing apparatus to control the operation of the robotic assemblies 200 and other components of the storage library 100. In this regard, the power/controller module may encompass one or more apparatuses, devices, and machines for processing data, including by way of example a programmable processor, a computer, or multiple processors or computers.

With reference to FIGS. 1-2, at least one robotic assembly 200 is mounted over (but not necessarily to) each of the first and second storage arrays 104, 108 for moving (e.g., translating, sliding, etc.) along an x-axis 300 that horizontally extends along a length of the first and second storage arrays 104, 108. For instance, first and third robotic assemblies $200_1$, $200_3$ may be mounted for x-axis translation over the first storage array 104 and second and fourth robotic assemblies $200_2$, $200_4$ may be mounted for x-axis translation over the second storage array 108. However, more or fewer than two robotic assemblies 200 may be mounted over each of the first and second storage arrays 104, 108. In any case, and as will be discussed in more detail herein, each robotic assembly 200 may be configured to access or manipulate media elements of both of the first and second storage arrays 104, 108 as well as translate along the x-axis 300 past another one of the robotic assemblies 200, even when robot arms 204 of the robotic assemblies 200 are disposed at the same height along a z-axis 308 that vertically extends along a height of the first and second storage arrays 104, 108.

With reference now to FIGS. 1-3 and 5, each robotic assembly 200 may include at least one x-axis guiding apparatus that is configured to engage with a corresponding x-axis guiding apparatus of the storage library 100 to facilitate translation (e.g., sliding, movement, displacement) of the robotic assembly 200 along the x-axis 300 (or along a course that is parallel to the x-axis 300). As an example, each robotic assembly 200 may include a first (e.g., upper) guiding apparatus 208 and an opposite second (e.g., lower) guiding apparatus 212 that are configured to respectively engage with corresponding first and second opposite x-axis guiding apparatuses 128, 132 near or adjacent upper and lower portions of the first or second storage array 104, 108. For instance, first and second x-axis guiding apparatuses 128, 132 may be in the form of a rail assembly including tracks, grooves, rails, etc. and the first and second guiding apparatuses 208, 212 may include rollers (e.g., wheels) or the like that are respectively configured to be received in and translate along the rail assembly to move the robotic assembly 200 along or parallel to the x-axis 300. However, the x-axis guiding apparatuses may take numerous other forms, all of which are encompassed herein.

Each robotic assembly 200 may also include a z-axis guiding apparatus 216 that is configured to facilitate translation (e.g., sliding, movement, displacement) of the robot arm 204 along or parallel to the z-axis 308. As just one example, the z-axis guiding apparatus 216 may include a rail assembly 220 extending along or parallel to the z-axis 308 and interconnected between the first and second x-axis guiding apparatuses 208, 212, and a z-axis translation member (not shown) appropriately interconnected to the robot arm 204 that is configured to translate (e.g., slide, move, etc.) along the rail assembly 220. For instance, the z-axis translation member may include a plurality of bearing members (e.g., rollers, wheels, balls) that are configured to roll or ride along the rail assembly 220 to move the robot arm 204 along or parallel to the z-axis 308. While one arrangement for facilitating movement of the robot arm 204 along or parallel to the z-axis 308 is illustrated, it is to be understood that various other arrangements for and manners of moving the robot arm 204 along or parallel to the z-axis 308 are envisioned and encompassed herein.

As discussed previously, the robot arms of two or more existing robotic assemblies mounted on the same rail assembly over a common storage array are sometimes configured to manipulate media elements of either of first or second spaced storage arrays (e.g., such as first and second storage arrays 104, 108), such as by pivoting or rotating through 180° (e.g., about a pivot axis that extends along or is otherwise parallel to the z-axis 308) or the like to access the first or second storage arrays as appropriate. However, contention between the two or more robotic assemblies often arises when one of the robotic assemblies needs to move to a location (e.g., along x-axis 300) that is past another one of the robotic assemblies resulting in media element access delays and other inefficiencies within the storage library. Even if first and second of such robotic assemblies were respectively mounted over the first and second storage arrays on different respective rail assemblies, contention would still result because the pivot axes of the robot arms are typically disposed halfway between the first and second storage arrays (e.g., halfway along y-axis 304) to allow the robot arms to access either of the first or second storage arrays by pivoting through 180°.

As will be discussed in more detail in the discussion that follows, the robot arm 204 of each robotic assembly 200 is pivotable (e.g., swingable, flippable, etc.) between a first position adjacent a storage array over which the robotic assembly 200 is mounted (e.g., the first storage array 104 for robotic assemblies $200_1$, $200_3$; the second storage array 108 for robotic assemblies $200_2$, $200_4$) for manipulating media elements of the storage array and a second position adjacent an opposite storage array (e.g., the second storage array 108 for robotic assemblies $200_1$, $200_3$; the first storage array 104 for robotic assemblies $200_2$, $200_4$) for manipulating media elements of the opposite storage array. In the first position (e.g., see FIGS. 1-3), the robot arm 204 is fully contained between the storage array over which the robotic assembly 200 is mounted and a central reference plane 320 between the storage arrays to create a space 136 between the central reference plane 320 and the opposite storage array within the interior space 116 of the storage library 100 through which another robotic assembly 200 mounted over the opposite storage array can pass (e.g., even when the robot arms 204 of the two robotic assemblies 200 are disposed at the same height along the z-axis 308 within the storage library 100). For instance, see space 136 created by robot arms 204 of first and third robotic assemblies $200_1$, $200_3$ in FIG. 2 after pivoting into its first position adjacent first storage array 104 through which the second and/or fourth robotic assemblies $200_2$, $200_4$ (e.g., with their robot arms 204 in their first positions adjacent second storage array 108) can pass along or parallel to the x-axis 300.

Additional reference is now made to FIGS. 3-9 which present various views of a robot arm 204 of the first robotic assembly $200_1$ in various different rotational positions. It is to be understood that this discussion is applicable to additional robotic assemblies used with the storage library (e.g., second, third and fourth robotic assemblies $200_2$, $200_3$, $200_4$, etc.). Broadly, each robot arm 204 may generally include a housing 228 (e.g., constructed of plastics, composites, etc.) having first and second opposite free ends 240, 244 as well as first (e.g., upper) and second (e.g., lower) opposite surfaces 232, 236. The housing 228 is configured to house or otherwise contain any appropriate electronics and other components for use in completing jobs within the storage library 100 such as a picker assembly that is configured to telescope out of the first free end 240 to grab media elements, a scanning device that is configured to read information on the media elements and media players, and the like.

The robot arm 204 is pivotally attached to the z-axis guiding apparatus 216 through a mounting apparatus 246 that is appropriately attached to the z-axis guiding apparatus 216 and a series of rigid linkages (e.g., rigid bodies, bars, brackets, etc. of any appropriate material(s) such as metals, plastics, composites, etc.) pivotally attaching the mounting apparatus 246 to the robot arm 204 that collectively form a movable closed-chain linkage that allows for movement of the robot arm 204 between its first and second positions (e.g., first position of robot arm 204 of first robotic assembly $200_1$ shown in FIGS. 1-4, 7 and 9; second position of robot arm 204 of first robotic assembly $200_1$ shown in FIGS. 5, 6, 8 and 9) in response to any appropriate input force applied to pivot one of the linkages (e.g., by a motor under command of a system controller). In one arrangement, the plurality of linkages may include a first rigid linkage 248 pivotally attached to the mounting apparatus 246 at a first pivot axis 250 (e.g., via any appropriate pivot pin(s) or member(s)) and pivotally attached to the robot arm 204 at a second pivot axis 252 (e.g., via any appropriate pivot pin(s) or member(s)) spaced from the first pivot axis 250. The plurality of linkages may also include a second rigid linkage 254 pivotally attached to the mounting apparatus 246 at a first pivot axis 256 (e.g., via any appropriate pivot pin(s) or member(s)) and pivotally attached to the robot arm 204 at a second pivot axis 258 (e.g., via any appropriate pivot pin(s) or member(s)) spaced from the first pivot axis 256.

In this regard, the mounting apparatus 246, robot arm 204, and first and second rigid linkages 248, 254 may form a four-bar linkage where the mounting apparatus 246 serves as the fixed link or frame, the first linkage 248 serves as the driver or crank, the second linkage 254 serves as the rocker or follower, and the robot arm 204 serves as the coupler or connector between the first and second linkages. The locations of the first and second pivot axes 250, 252 of the first linkage 248 and the first and second pivot axes 256, 258 of the second linkage 254 may be appropriately chosen to induce the movement of the robot arm 204 between its first and second (e.g., and intermediate) positions in response to an input force applied to the first linkage 248 to rotate the first linkage 248 about its first pivot axis 250 through the mounting apparatus 246 in one of clockwise or counter-clockwise directions. While the pivot axes 250, 252, 256, 258 are all shown as being along or parallel to the z-axis 308 to allow the robot arm 204 to swing or pivot within a plane that is parallel to the x and y-axes 300, 304, the pivot axes 250, 252, 256, 258 may in other embodiments all be along or parallel to the x-axis 300 to allow the robot arm 204 to swing or pivot within a plane that is parallel to the y and z-axes 304, 308.

In one arrangement, the mounting apparatus 246 may be in the form of a rigid member (e.g., rigid bracket) that is attached to the z-axis guiding apparatus 216 of the robotic assembly 200 in any appropriate manner. For instance, the mounting apparatus 246 may include a mounting portion 260 that is shaped and sized to receive the rail assembly 220 of the z-axis guiding apparatus 216 and configured to be slidably secured thereto (e.g., through a z-axis translation member) for movement along or parallel to the z-axis 308 in response to signals received from the system controller or the like (e.g., such as through wheels or other bearing members between the rail assembly 220 and the mounting portion 260 and z-axis translation member).

The first rigid linkage 248 may be driven about its first pivot axis 250 through the mounting apparatus 246 to induce movement of the robot arm 240 between its first position (e.g., see FIGS. 3, 4 and 7) and its second position (e.g., see FIGS. 5, 6 and 8) as disclosed herein in any appropriate manner. In one arrangement, a drive shaft of a motor may operate (e.g., in response to signals from the system controller) to rotate one or more gears to drive the first rigid linkage 248 about its first pivot axis 250. As an example, a motor 262 may be appropriately secured to (or otherwise be non-movable relative to) the mounting apparatus 246, where a gear (e.g., pinion, having a series of gear teeth, etc., not shown) secured about a drive shaft (not shown) of the motor 262 is configured to engage with and drive a series of gear teeth 264 of the first rigid linkage 248. For instance, the gear teeth 264 may form at least a portion of an annular gear that is built directly into or otherwise formed on the first rigid linkage 248. As another example, a separate annular gear configured to appropriate mesh with the gear of the motor 262 may be secured to the first rigid linkage 248 in any appropriate manner.

As shown in FIGS. 7-8, the series of gear teeth 264 of the first rigid linkage 248 may follow a curvilinear path 266 (e.g., a portion of a circle or an arc) that is perpendicular to a reference plane 268 extending through the first and second pivot axes 250, 252 of the first rigid linkage 248. This arrangement allows the motor 262 to drive the first rigid linkage 248 in either of clockwise or counterclockwise directions about the first pivot axis 250. In another arrangement, the drive shaft of a motor may be directly connected to a pivot member of the first rigid linkage 248 along the first pivot axis 250 through the mounting apparatus 246 such that rotation of the drive shaft about the first pivot axis 250 induces corresponding rotation of the pivot member and thus the first rigid linkage 248 about the first pivot axis 250. Of course, other manners of inducing rotation of the first rigid linkage 248 about the first pivot axis 250 are also envisioned and encompassed herein.

In one arrangement, one or both of the first and second rigid linkages 248, 254 may include a pair of spaced portions that are respectively configured to overlap the first and second surfaces 232, 236 of the housing 228 of the robot arm 204 to contain the housing 228 therebetween and thereby stabilize the housing 228 against movement other than swinging movement between the first and second positions as disclosed herein. As an example, the first rigid linkage 248 may include spaced first and second portions 270, 272 that are non-movable relative to each other and that are respectively pivotally attached to the first and second surfaces 232, 236 of the robot arm at the second pivot axis 252 and to the mounting apparatus 246 at the first pivot axis 250. For instance, a first pivot member (e.g., pin, etc., not labeled) may be disposed through the first portion 270 of the first rigid linkage 248 and the first surface 232 of the robot arm 204 along the second pivot axis 252 while a second pivot member (e.g., pin, etc., not labeled) may be disposed through the second portion 272 of the first rigid linkage 248 and the second surface 236 of the robot arm 204 along the second pivot axis 252. In this embodiment, the series of gear teeth 264 may be disposed in or on the first portion 270 of the first rigid linkage 248.

To facilitate the reader's understanding of how the disclosed utilities reduce contention between robotic assemblies within a storage library, operation of the robotic assemblies 200 will now be discussed. Initially, each robot arm 204 of each of the first, second, third and fourth robotic assemblies $200_1$, $200_2$, $200_3$, $200_4$ may be disposed in its first position relative to the particular storage array over which it is mounted. In the case of the first and third robotic assemblies $200_1$, $200_3$, the first free end 240 of the robot arm 204 is adjacent the first storage array 104 (e.g., to allow a picker assembly within the housing 228 of the robot arm 204 to emerge from the first free end 240 and manipulate media elements of the slots 116 of the first storage array 104) while the second free end 244 of the robot arm 204 is spaced from the first storage array 104 but disposed between the first storage array 104 and the central reference plane 320 (e.g., on one side of the central reference plane 320). In the case of the second and fourth robotic assemblies $200_2$, $200_4$, the first free end 240 of the robot arm 204 is adjacent the second storage array 108 (e.g., to allow a picker assembly within the housing 228 of the robot arm 204 to emerge from the first free end 240 and manipulate media elements of the slots 116 of the second storage array 108) while the second free end 244 of the robot arm 204 is spaced from the second storage array 108 but disposed between the second storage array 108 and the central reference plane 320 (e.g., on an opposite side of the central reference plane 320 from the second free ends 244 of the robot arms 204 of the first and third robotic assemblies $200_1$, $200_3$).

In this regard, spaces 136 are created or otherwise exist between the central axis 320 and the second storage array 108 through which the second and fourth robotic assemblies $200_2$, $200_4$ (or other such robotic assemblies 200 mounted over the second storage array 108) can translate along or parallel to the x or z-axes 300, 308 (when the second and fourth robotic assemblies $200_2$, $200_4$ are in their first positions) and between the central axis 320 and the first storage array 104 through which the first and third robotic assemblies $200_1$, $200_3$ (or other such robotic assemblies 200 mounted over the first storage array 104) can translate along or parallel to the x or z-axes 300, 308 (when the first and third robotic assemblies $200_1$, $200_3$ are in their first positions) for completing jobs within the storage library 100.

Assume now that the system controller of the storage library 100 has received a request from a host computer for data located on a particular media element disposed within a slot 116 of the second storage array 108 and that the system controller has determined that the first robotic assembly $200_1$ is going to fulfill the request (e.g., by grabbing the media element and inserting the same into a media player 120 of the storage library 100). For instance, the system controller may, if necessary, instruct the first robotic assembly $200_1$ to translate or otherwise move along or parallel to the x-axis 300 to an x-axis coordinate that aligns with the particular media element in the second storage array 108

(e.g., via the x-axis guiding apparatus 208). The system controller may also, if necessary, instruct the first robotic assembly $200_1$ to translate or otherwise move its robot arm 204 along or parallel to the z-axis 308 to a z-axis coordinate that aligns with the particular media element in the second storage array 108 (e.g., via z-axis guiding apparatus 216). Part of the aforementioned process may include determining whether any other robotic assemblies 200 are disposed in the path of the first robotic assembly $200_1$ and/or its robot arm 204 and then commanding such robotic assemblies 200 to move to different locations in the storage library and/or waiting to move the first robotic assembly $200_1$ and/or its robot arm 204.

In any case, the system controller may then command the first robotic assembly $200_1$ to rotate its robot arm 204 in one of a clockwise or counterclockwise direction into its second position which so that its first free end 240 is now adjacent the second storage array 108 (e.g., to allow its picker assembly within the housing 228 of the robot arm 204 to emerge from the first free end 240 and manipulate media elements of the slots 116 of the second storage array 108) while its second free end 244 is spaced from the second storage array 108 but disposed between the second storage array 108 and the central reference plane 320 (e.g., on the opposite side of the central reference plane 320). For instance, compare FIGS. 3 and 5 and compare FIGS. 7-8. Also see first and second positions of robot arm 204 in FIG. 9. In other words, the first free end 240 has moved from a first position facing the first storage array 104 to a second position facing the second storage array 108 simultaneous with the second free end 244 moving from a first position on one side of the central reference plane 320 facing the second storage array 108 to a second position on an opposite side of the central reference plane 320 facing the first storage array 104, where the first and second positions of the second free end 244 are spaced from each other (e.g., along the y-axis 304).

For instance, the system controller may signal the motor 262 to rotate the drive shaft of the motor 262 in one of a clockwise or counterclockwise direction to engage the series of teeth 264 of the first rigid linkage 248 and thereby drive and pivot the first rigid linkage 248 about the first pivot axis 250 through the mounting apparatus 246 (e.g., in one of a clockwise or counterclockwise direction). Simultaneous with driving of the first rigid linkage 248 about the first pivot axis 250 in the one of the clockwise or counterclockwise directions, the second rigid linkage 254 is also driven about its first pivot axis 256 through the mounting apparatus 246 in the one of the clockwise or counterclockwise direction by virtue of the robot arm 204 coupling or connecting the first and second linkages at the second pivot axes 252, 258 through the robot arm 204.

The overall effect of the simultaneous pivoting of the first and second rigid linkages 248, 254 about their respective first pivot axes 250, 256 through the mounting apparatus 246 is non-circular, curvilinear motion of each of the first and second free ends 240, 244 of the robot arm 204 that flips the robot arm (e.g., by 180° or the like) so that each of the first and second free ends 240, 244 is facing a direction in the second position that is opposite that in the first position and is at a location in the second position that is spaced from its location in the first position. Note how second free end 244 of robot arm 204 is on opposite sides of the central reference plane 320 at spaced locations in the first and second positions in FIG. 9 (also note opposite spaced positions of first free end 240).

For instance, a first reference point 274 on the first free end 240 of the robot arm 204 may travel along a first course on a first non-circular, curvilinear path 276 between first and second positions while a second reference point 278 on the second free end 244 of the robot arm 204 may travel along a first course on a second non-circular, curvilinear path 280 between first and second positions. See FIG. 9. In one arrangement, the first and second curvilinear paths may not intersect each other. As shown, the first rigid linkage 248 (e.g., the second portion 272) may substantially overlap the first pivot axis 256 of the second rigid linkage 254 in the first positions of the first and second free ends 240, 244 of the robot arm 204 and substantially overlap the second pivot axis 258 of the second rigid linkage 254 in the second positions of the first and second free ends 240, 244 of the robot arm 204.

Figure 3:
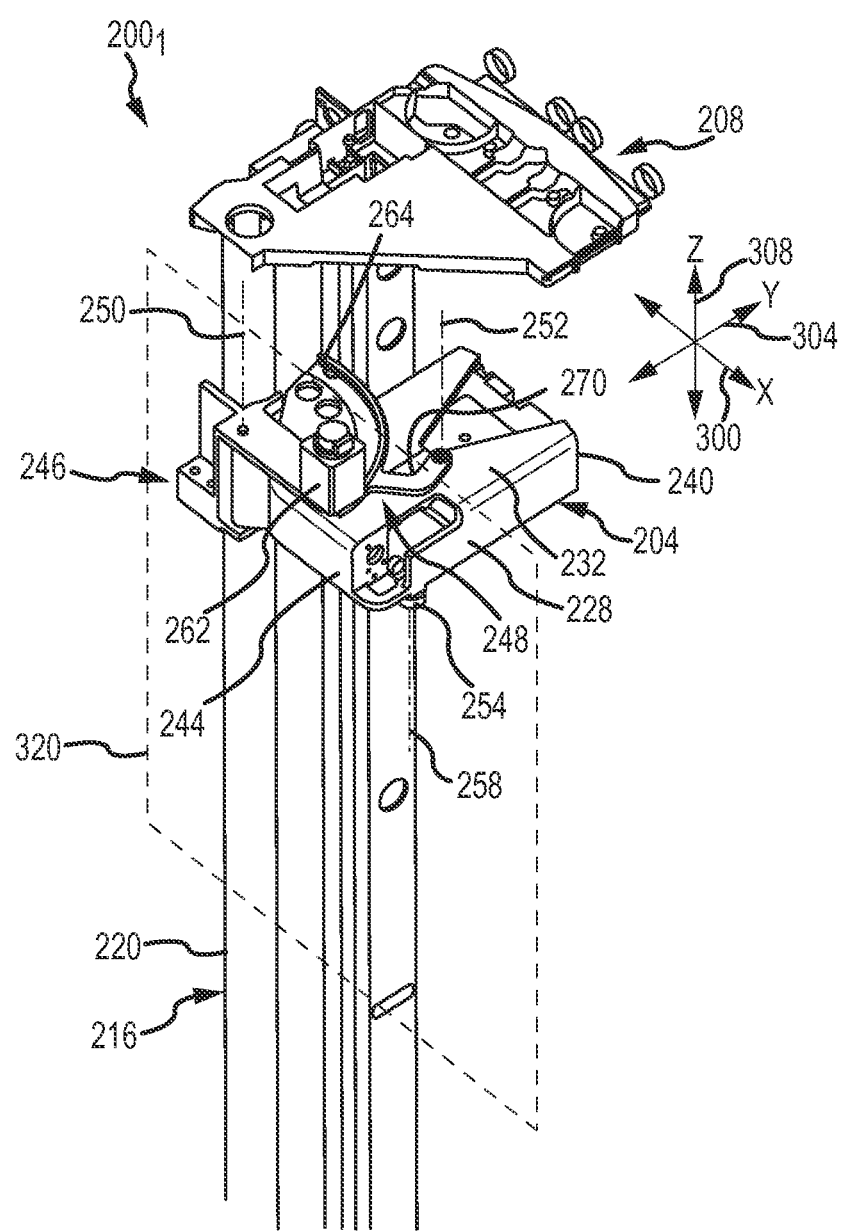
FIG. 3 is a perspective view of a robotic assembly disclosed herein, with a robot arm of the robotic assembly in a first position.
Figure 4:
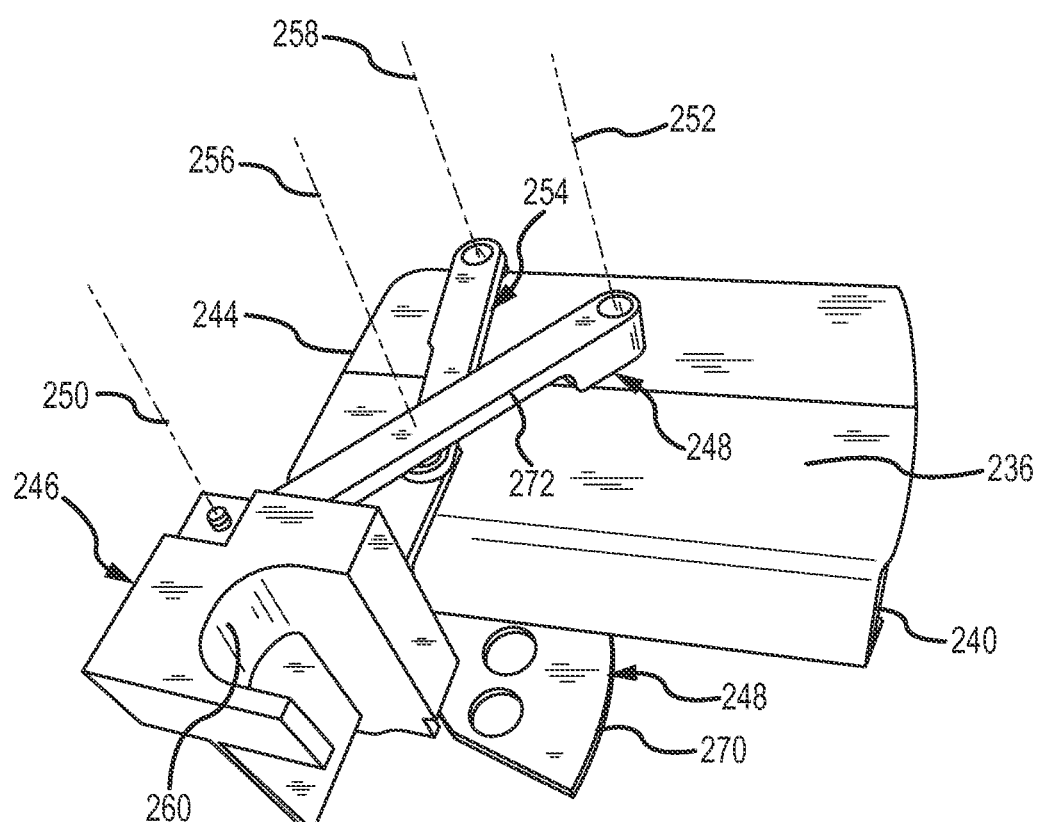
FIG. 4 is another perspective view of the robotic assembly of FIG. 3.
Figure 5:
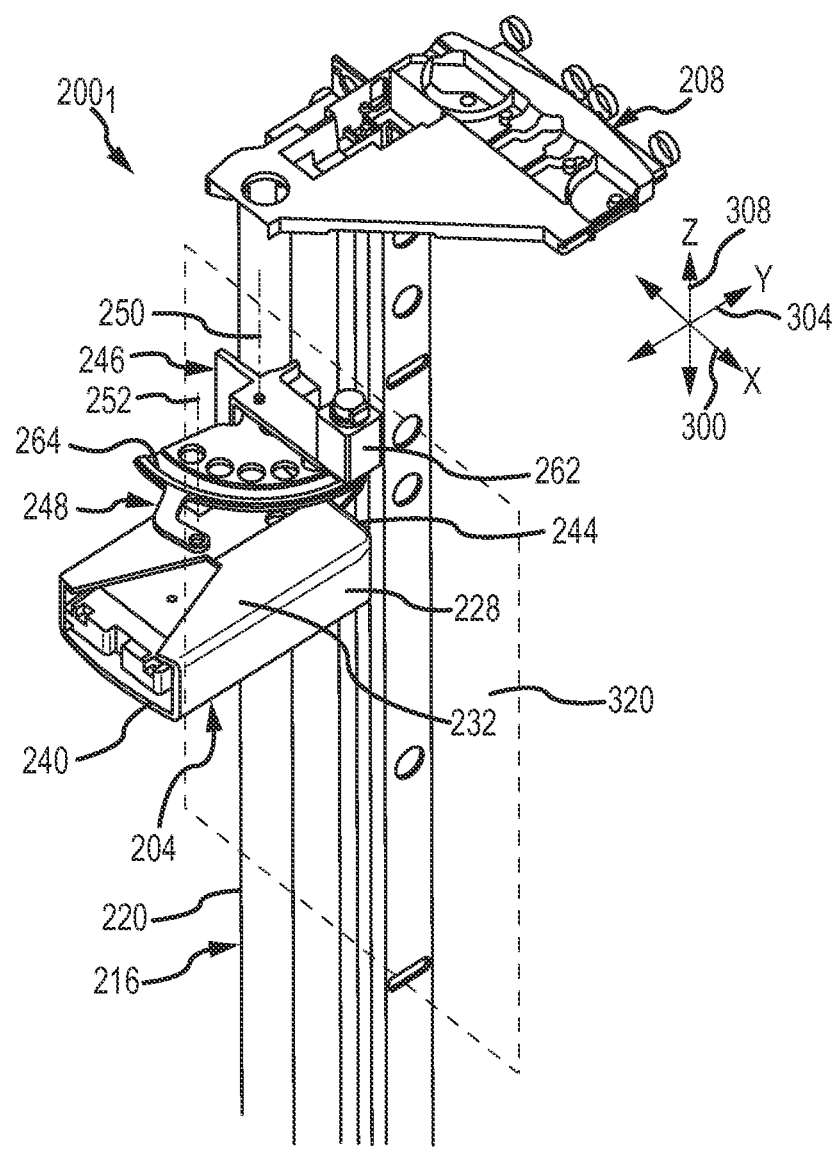
FIG. 5 is a perspective view similar to that in FIG. 3, but with the robot arm of the robotic assembly in a second position.
Figure 6:
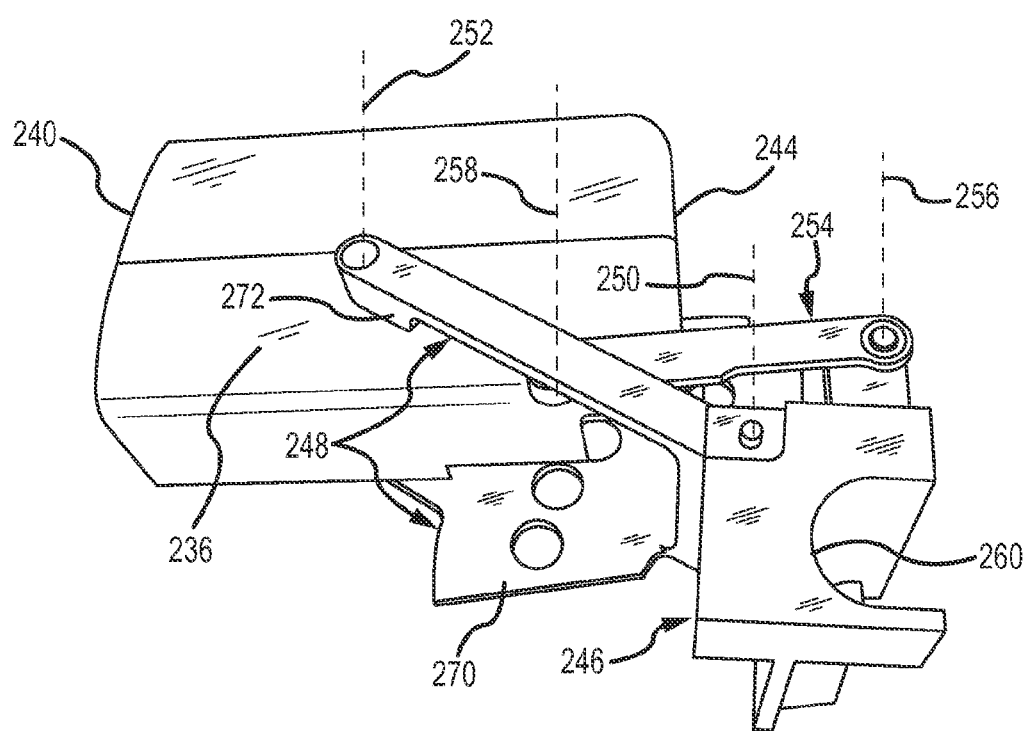
FIG. 6 is another perspective view of the robotic assembly of FIG. 5.
Figure 9:
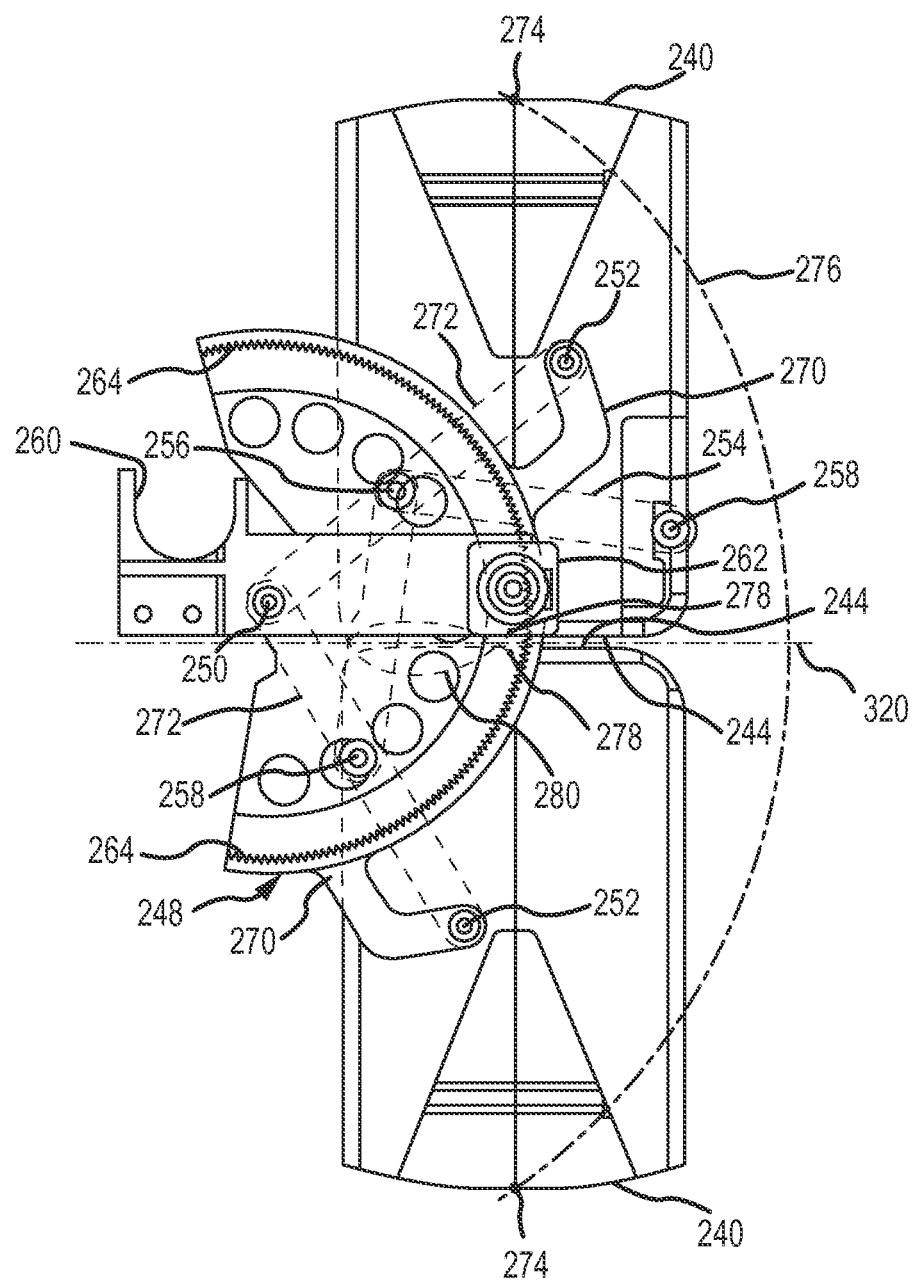
FIG. 9 is a plan view illustrating movement of the robotic assembly between the first and second positions of FIGS. 7 and 8.

The disclosed robotic assembly 200 thus allows the robot arm 204 to "reach across" the interior space 112 (e.g., aisle) of the storage library 100 by positioning the robot arm 204 closer to the second storage array 108 in the second position than it otherwise would have had the robot arm 204 pivoted about a single pivot axis that was fixed relative to the mounting apparatus 246 and/or the first and second storage arrays 104, 108. To return the robot arm 204 to its first position adjacent the first storage array 104, the system controller may signal the motor 262 to rotate the drive shaft of the motor 262 to drive the first rigid linkage 248 about the first pivot axis 250 through the mounting apparatus 246 in the other of the clockwise or counterclockwise direction and simultaneously flip the robot arm 204 by 180° or the like to move the first and second free ends 240, 244 of the robot arm 204 back into their first positions (e.g., back into their positions as shown in FIGS. 3, 4, and 7). For instance, the first and second reference points may respectively move in an opposite second course back along the first and second non-circular, curvilinear paths 276, 280. See FIG. 9.

Among other advantages, the disclosed robotic assemblies 200 may move their robot arms 204 between the first and second positions as disclosed herein through use of a single actuator or servo (e.g., the motor 262) rather than through use of two or more actuators (e.g., one to rotate or control rotation of the robot arm 204 and another to allow the robot arm 204 reach across the interior space 112). It will be readily appreciated that many additions and/or deviations may be made from the specific embodiments disclosed in the specification without departing from the spirit and scope of the invention. As one example, various other manners or arrangements for driving or otherwise inducing rotation of the first rigid linkage 248 about the first pivot axis 250 through the mounting apparatus 246 are envisioned and included herein. As another example, the first and second x-axis guiding apparatuses of the first and second storage arrays 104, 108 could in some arrangements be mounted in or on a ceiling and/or floor (not labeled) of the storage library 100.

Furthermore, the specific locations of the pivot axes 250, 252, 256, 258 may be different than those shown in the drawings so long as any such different locations allow the robot arm to flip or rotate between the disclosed first and second positions. Still further, the robot arm 204 may be stopped in one or more intermediate positions between the disclosed first and second positions (e.g., to allow the robot arm 204 to manipulate media elements or the like on another storage array or wall that is generally perpendicular to the first and second storage arrays 104, 108). Also, the utilities disclosed herein may be applied to robot arms other than those specifically shown herein.

The illustrations and discussion herein has only been provided to assist the reader in understanding the various aspects of the present disclosure. Furthermore, one or more various combinations of the above discussed arrangements and embodiments are also envisioned. While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

I claim:

1. A robotic assembly for manipulating media elements in a media element storage library, comprising:
    a mounting apparatus;
    a robot arm configured to manipulate media elements of either of a first storage array of the storage library and a second storage array of the storage library that is spaced from and faces the first storage array, wherein the robot arm includes a first free end and an opposite second free end;
    a first rigid linkage pivotally attached to the mounting apparatus at a first pivot axis through the mounting apparatus and pivotally attached to the robot arm at a second pivot axis through the robot arm; and
    a second rigid linkage pivotally attached to the mounting apparatus at a first pivot axis through the mounting apparatus and pivotally attached to the robot arm at a second pivot axis through the robot arm, wherein the first pivot axis of the first rigid linkage is spaced from the first pivot axis of the second rigid linkage, wherein the second pivot axis of the first rigid linkage is spaced from the second pivot axis of the second rigid linkage, wherein rotation of the first rigid linkage about its first pivot axis through the mounting apparatus induces movement of the first free end of the robot arm between a first position adjacent and facing the first storage array in a first direction and a second position adjacent and facing the second storage array in an opposite second direction while simultaneously inducing movement of the opposite second free end of the robot arm between a first position on a first side of a central reference plane between the first and second storage arrays and a second position on an opposite second side of the central reference plane.

2. The robotic assembly of claim 1, wherein rotation of the first rigid linkage about its first pivot axis through the mounting apparatus induces rotation of the second rigid linkage about its first pivot axis through the mounting apparatus.

3. The robotic assembly of claim 2, wherein rotation of the first rigid linkage about its first pivot axis through the mounting apparatus in one of a clockwise or counterclockwise direction induces rotation of the second rigid linkage about its first pivot axis through the mounting apparatus in the one of the clockwise or counterclockwise direction.

4. A robotic assembly for manipulating media elements in a media element storage library, comprising:
    a mounting apparatus;
    a robot arm configured to manipulate media elements of either of a first storage array of the storage library and a second storage array of the storage library that is spaced from the first storage array, wherein the robot arm includes a first free end and an opposite second free end;
    a first rigid linkage pivotally attached to the mounting apparatus at a first pivot axis through the mounting apparatus and pivotally attached to the robot arm at a second pivot axis through the robot arm; and
    a second rigid linkage pivotally attached to the mounting apparatus at a first pivot axis through the mounting apparatus and pivotally attached to the robot arm at a second pivot axis through the robot arm, wherein the first pivot axis of the first rigid linkage is spaced from the first pivot axis of the second rigid linkage, wherein the second pivot axis of the first rigid linkage is spaced from the second pivot axis of the second rigid linkage, wherein rotation of the first rigid linkage about its first pivot axis through the mounting apparatus induces movement of the first free end of the robot arm between a first position adjacent and facing the first storage array and a second position adjacent and facing the second storage array while simultaneously inducing movement of the opposite second free end of the robot arm between a first position on a first side of a central reference plane between the first and second storage arrays and a second position on an opposite second side of the central reference plane, wherein the first rigid linkage includes a series of gear teeth that are configured to be engaged by a corresponding series of gear teeth to drive rotation of the first rigid linkage about its first pivot axis through the mounting apparatus.

5. The robotic assembly of claim 4, wherein the series of gear teeth of the first rigid linkage follow a curvilinear path.

6. The robotic assembly of claim 5, wherein a reference plane extending through the first and second pivot axes of the first rigid linkage is perpendicular to the curvilinear path.

7. The robotic assembly of claim 5, wherein the series of gear teeth of the first rigid linkage are included on an annular gear of the first rigid linkage.

8. The robotic assembly of claim 4, wherein the first rigid linkage includes spaced first and second portions, wherein the first portion is pivotally attached to the second pivot axis through the robot arm over a first surface of the robot arm, wherein the second portion is pivotally attached to the second pivot axis through the robot arm over a second surface of the robot arm, wherein the first surface is opposite the second surface, and wherein one of the first and second portions includes the series of gear teeth.

9. The robotic assembly of claim 8, further including:
   a first pivot member disposed through the first portion of the first rigid linkage and the first surface of the robot arm along the second pivot axis of the first rigid linkage; and
   a second pivot member disposed through the second portion of the first rigid linkage and the second surface of the robot arm along the second pivot axis of the first rigid linkage.

10. The robotic assembly of claim 1, wherein the first rigid linkage overlaps the first pivot axis of the second rigid linkage in the first positions of the first and second free ends of the robot arm, and wherein the first rigid linkage overlaps the second pivot axis of the second rigid linkage in the second positions of the first and second free ends of the robot arm.

11. A method of operating a robotic assembly of a media element storage library, comprising:
   first moving a first free end of a robot arm of a robotic assembly from a first position adjacent a storage slot opening of a first storage array of a media element storage library to a second position adjacent a storage slot opening of a second storage array, wherein the storage slot opening of the second storage array is spaced from and faces the storage slot opening of the first storage array; and
   second moving, simultaneous with the first moving, a second free end of the robot arm from a first position to a second position towards the second storage array and spaced from the first position of the second free end, wherein the first free end is opposite the second free end.

12. The method of claim 11, wherein the first moving includes moving a reference point on the first free end along a first course on a first curvilinear path between the first and second positions of the first free end, and wherein the second moving includes moving a reference point on the second free end along a first course on a second curvilinear path between the first and second positions of the second free end.

13. The method of claim 12, further including:
   third moving the first free end of the robot arm of the robotic assembly from the second position adjacent the second storage array to the first position adjacent the first storage array, wherein the third moving includes moving the reference point on the first free end along a second course on the first curvilinear path that is opposite to the first course; and
   fourth moving, simultaneous with the third moving, the second free end of the robot arm from the second position to the first position towards the first storage array, wherein the fourth moving includes moving the reference point on the second free end along a second course on the second curvilinear path that is opposite to the first course.

14. The method of claim 12, wherein the first and second curvilinear paths do not intersect.

15. The method of claim 11, further including:
   first rotating a first rigid linkage about a first pivot axis through a mounting apparatus, wherein the first rigid linkage is pivotally attached to the robot arm at a second pivot axis; and
   second rotating, in response to and simultaneous with the first rotating, a second rigid linkage about a first pivot axis through the mounting apparatus, wherein the second rigid linkage is pivotally attached to the robot arm at a second pivot axis, and wherein the first and second rotating induce the first and second moving.

16. The method of claim 15, further including:
   engaging a series of gear teeth of the first linkage with a corresponding series of gear teeth of a drive shaft of a motor to first rotate the first rigid linkage about its first pivot axis through the mounting apparatus.

17. The method of claim 16, wherein the motor is secured to the mounting apparatus.

18. The method of claim 15, wherein the first rigid linkage overlaps the first pivot axis of the second rigid linkage in the first positions of the first and second free ends of the robot arm, and wherein the first rigid linkage overlaps the second pivot axis of the second rigid linkage in the second positions of the first and second free ends of the robot arm.

19. The method of claim 11, wherein the first free end faces in a first direction in the first position, and wherein the first free end faces in an opposite section direction in the second position.

20. The method of claim 11, wherein the second free end faces in a first direction in the first position, and wherein the second free end faces in an opposite section direction in the second position.

* * * * *

UNITED STATES PATENT AND TRADEMARK OFFICE
CERTIFICATE OF CORRECTION

PATENT NO. : 10,029,365 B2
APPLICATION NO. : 14/578675
DATED : July 24, 2018
INVENTOR(S) : Ostwald It is certified that error appears in the above-identified patent and that said Letters Patent is hereby corrected as shown below:

In the Specification

In Column 1, Line 25, delete "(IO)" and insert -- (I/O) --, therefor.

In Column 5, Line 9, delete "positions" and insert -- positions. --, therefor.

Signed and Sealed this
Fourteenth Day of May, 2019

Andrei Iancu
*Director of the United States Patent and Trademark Office*